United States Patent Office 3,696,063
Patented Oct. 3, 1972

3,696,063
**THERMOSETTING REFLOW RESINS OF COPOLY-
MERS OF ALKYL METHACRYLATES**
Ludwig Mott, Leverkusen, Richard Muller, Bergisch-
Neukirchen, Karl Dinges, Odenthal, and Heinz-Walter
Krauss, Leverkusen, Germany, assignors to Farben-
fabriken Bayer Aktiengesellschaft, Leverkusen, Ger-
many
No Drawing. Filed May 13, 1970, Ser. No. 37,051
Claims priority, application Germany, May 23, 1969,
P 19 26 563.5
Int. Cl. C09d 3/14, 3/80
U.S. Cl. 260—17 R                              2 Claims

ABSTRACT OF THE DISCLOSURE

Solvent containing spontaneously crosslinking coating agent comprising a copolymer of an alkyl ester of methacrylic acid, an alkyl ester of acrylic acid and N-hydroxymethyl-acrylamide or methacrylamide and/or an alkyl ether thereof, said copolymer optionally containing an α,β-unsaturated carboxylic acid amide and/or an α,β-unsaturated monocarboxylic or dicarboxylic acid.

---

It is known that objects made from many types of material can be provided with coatings, either to protect them from the influences of weather or corrosive substances or to provide a decorative effect. For this purpose, it is common practice to use liquid systems which are applied by different methods, including for example dip-coating, spray-coating or brush-coating. The binders of these systems frequently differ in nature and belong to different chemical groups.

One feature common to all these systems is that after the coatings have dried, optionally under the effect of heat, the coated article can show more or less conspicuous faults. For example, levelling faults can occur in coatings dried at room temperature as a result of excessively thick application to vertical surfaces. With heat-treated stoved systems, bubbles and craters can be formed as a result of the solvent boiling, or defective areas can be formed by running on excessively thick parts of the coating.

The elimination of these faults with conventional means, for instance hand-grinding or mechanical griding, leaves conspicuous traces, and in some instances even uncovers the primer if the fault was a serious one involving considerable grinding. The area of the fault either has to be polished, which is not possible with some binder systems, or another coating or lacquer has to be applied if, as mentioned above, the coating was ground through to the primer.

This phenomenon is of particular disadvantage if the coated system has to be treated at an elevated temperature before it assumes its final quality. The relacquered areas also have to be subjected to another heat treatment, as a result of which the entire object has to be reheated, although only limited areas of the article may have been relacquered. Naturally, this involves considerable expense, especially when large numbers of objects are involved. In addition, entire manufacturing plants can be brought to a standstill through this repeated lacquering operation.

This disadvantage, which has a particularly serious effect upon stoved systems and objects of complicated design, is in need of elimination.

As already mentioned, various classes of binders have been used to produce air-drying or thermosetting coating lacquers, depending on requirements. Of all these known binders, polyacrylate-based resins are mentioned in particular insofar as they are distinguished by their outstanding polishability. Nevertheless, this is not sufficient to eliminate serious faults are referred to above, only minor faults.

One attempt to provide a more rational procedure (especially for stoved systems) has been to dry the coating to only a limited extent after it had been applied. In some instances, this could be effected at room temperature, or even by forced drying at slightly elevated temperature. Thereafter, the coating was inspected for faults, and then hardened at elevated temperature into its final finish, following the elimination of any faults and/or optionally respraying relatively small defective areas. In this respect, the particular binder system had to pass through a thermoplastic phase, any traces of grinding and/or small relacquered areas being equalised through levelling with the rest of the coating.

Systems of this kind are described in German Auslegeschrift No. 1,103,486. They are based on mixtures of methyl methacrylate polymers with cellulose acetobutyrate and/or plasticisers, other lacquer auxiliaries and pigments.

Systems such as these, based on methyl methacrylate polymers, cellulose acetobutyrate and plasticisers are used in the lacquering of products in large numbers, for example in the motor car industry, the expression "thermoplastic reflow" and the abbreviated expression "bake-sand bake," which actually describes the process, being familiar to any competent expert.

The prior art polymers numbered 1 and 2 in Comparison Tests (see below), and the lacquer mixtures obtained from them by conventional methods, are distinguished by their outstanding weathering resistance, but their adhesion to nonpretreated panels, as tested by the flexing test and the lattice-cut test, and their resistance to solvents are both unsatisfactory. Their elasticity on panels with a corrosion-resistant substrate or primer, for example a stoved epoxy ester primer, is also inadequate insofar as although there is no sign of the lacquer film becoming detached at the flexing point, it has nevertheless very many fine hair cracks. Table 1 below sets out the individual measurements as determined by the particular testing methods quoted.

It is possible to improve the resistance of these systems to solvents by adding reactive melamine resins and optionally crosslinking accelerating catalyst, but this improvement can only be achieved at the expense of embrittlement and a further reduction in adhesion to nonpretreated substrates. Attempts have been made to avoid adding foregoing-reacting resins, and to impart spontaneous crosslinking properties to the polyacrylate.

Surprisingly, it has now been found that acrylates containing methylolated and optionally etherified unsaturated carboxylic acid amides in copolymerised form, are suitable for use as coating agents for the so-called thermoplastic reflow process. It has also been found that, in addition to the expected improvement in resistance to solvent, adhesion of the film is distinctly increased, especially when acid catalysts, for example phosphoric acid are used.

Accordingly, the present invention relates to a solvent-containing spontaneously crosslinking coating agent for the thermoplastic reflow lacquering process, which comprises a copolymer of (a) 60 to 95% by weight of an alkyl ester of methacrylic acid having from 1 to 3 carbon atoms in the alkyl radical,
(b) 0.1 to 15% by weight of an alkyl ester of acrylic acid having from 1 to 4 carbon atoms in the alkyl radical,
(c) 0.5 to 20% by weight of N-hydroxymethyl-acrylamide or -methacrylamide and/or an alkyl ether having from 1 to 8 carbon atoms in the alkyl radical thereof, (d) 0 to 10% by weight of an α,β-unsaturated carboxylic acid amide having from 3 to 5 carbon atoms, and
(e) 0 to 10% by weight of an α,β-unsaturated monocarboxylic or dicarboxylic acid with from 3 to 5 carbon atoms, the sum of the percentages is always 100.

It is preferred to use a copolymer of 75 to 90% by weight of the methacrylic acid alkyl ester (a), 2 to 10% by weight of the acrylic acid alkyl ester (b), 0.5 to 15% by weight of the N-hydroxymethyl-acrylamide or methacrylamide and/or its ether (c), 0 to 5% by weight of the carboxylic acid amide (d) and 0.1 to 5% by weight of the monocarboxylic or dicarboxylic acid (e).

The copolymers are prepared by methods known per se including solution polymerisation, optionally in the presence of a regulating substance, for example a mercaptan, in a solvent mixture with the aid of a radical-forming catalyst.

Mixtures of (1) aromatic solvents, such as toluene or xylene,
(2) alcohols such as n-butanol or isobutanol and
(3) ketones or esters, such as methyl ethyl ketone, ethyl acetate, acetone or methyl isobutyl ketone, may for example, be used as solvents.

Suitable monomeric methacrylic acid alkyl esters (a) include methyl methacrylate, ethyl methacrylate, n-propyl methacrylate and isopropyl methacrylate; methyl methacrylate preferably being used.

Examples of monomeric acrylic acid esters (b) include methyl acrylate, ethyl acrylate, n-butyl acrylate, and isobutyl acrylate; methyl acrylate being preferred.

The crosslinking components (c) include the N-hydroxymethyl derivatives of methacrylamide and/or acrylamide and/or their alkyl ethers with from 1 to 8 carbon atoms, especially with from 1 to 4 carbon atoms, in the alkyl group such as N-hydroxymethyl-methacrylamide, N-hydroxymethyl-acrylamide, N-methoxymethyl - acrylamide, and N-butoxymethyl-acrylamide, preferably N-methoxymethyl-acrylamide.

Examples of α,β-unsaturated carboxylic acid amides (d) include α,β-unsaturated carboxylic acid amides with from 3 to 5 carbon atoms, preferably acrylamide and/or methacrylamide, although it is also possible to use amides of other ethylenically unsaturated monocarboxylic or dicarboxylic acids for example crotonic acid amide, itaconic acid amide, maleic acid diamide and fumaric acid diamide.

Suitable copolymerisable carboxylic acids (e) include α,β-unsaturated monocarboxylic and dicarboxylic acids with from 3 to 5 carbon atoms, such as acrylic acid, methacrylic acid, maleic acid, fumaric acid, itaconic acid and mixtures thereof.

It is of advantage to use 100 parts by weight of the copolymers according to the invention in admixture with 10 to 30 parts by weight of cellulose acetobutyrate and 20 to 60 parts by weight of plasticiser.

Phthalates, for example benzyl butyl phthalate, dibutyl phthalate, and dicyclohexyl phthalate; phosphates, for example tricresyl phosphate, and triphenyl phosphate; and adipates, for example dibutyl adipate or benzyl octyl adipate, are particularly suitable plasticisers which are compatible with the copolymer-cellulose acetobutyrate mixture.

In addition, the pigments normally used in the lacquer industry may be used as pigments, for example titanium dioxide, iron oxide, chromium oxide, carbon black, aluminium bronze, and enamel pigments. It is also possible to use fillers of the silica or sulphate type, or phthalocyanine dyes.

Anticorrosive pigments, such as zinc chromate, lead chromate and strontium chromate, may also be used for special anticorrosion paints. The pagment may be added in a quantity of from 0 to 120% by weight based on solid copolymer, depending upon the type of pigment and the purpose for which the lacquer is to be ultimately used.

The carboxylic acids incorporated in the copolymer, if any, may act as hardening catalysts, although it is also possible to use additional acids, such as phosphoric acid or maleic acid, in quantities of from 0.1 to 5% by weight, based on copolymer.

In the context of this invention, conventional lacquer auxiliaries include for example silicone oils. They are advantageously used in quantities of from 0.01 to 1% by weight, based on solid copolymer.

The solvents used to prepare the copolymers may also be used as solvents for the copolymers to be employed in the coating agents. Solvents such as these include aromatic hydrocarbons such as toluene or xylene, alcohols such as n-butanol or isobutanol, and ketones or esters such as methyl ethyl ketone, ethyl acetate, acetone or methyl isobutyl ketone.

n-Butanol, toluene and methyl ethyl ketone are preferably used as solvents.

The solvents are advantageously used in quantities of from 40 to 90% by weight, based on copolymer.

The copolymer solutions are mixed with cellulose aceto butyrate, plasticisers, pigments, hardening catalysts and lacquer auxiliaries by the process normally employed in the lacquer industry.

The finished coating agents can be applied by spraying, dip-coating or brush-coating to a variety of metallic substrates such as iron, aluminium, zinc, copper or brass. The films show outstanding adhesion to these substrates. Adhesion to other layers of lacquer, for example those based on alkyd resins, epoxy resins, polyurethanes, or phenolic resins, or to already existing layers of the same material, is also excellent.

After the coating agents have been applied to the substrates, the supporting materials can be dried for 1 to 24 hours at room temperature or for 15 to 45 minutes at temperatures of from 60 to 90° C. The surfaces can be worked in this state. They can be inspected for faults, ground or resprayed if necessary, and then hardened for 45 to 15 minutes at elevated temperatures of from 120 to 150° C. to give the final finish. Final hardening is accompanied by levelling and adhesion with the first coat applied which in turn softens, levels and forms a uniformly glossy hard film during this ultimate hardening stage.

In addition to the excellent appearance of the films, i.e. good levelling, high gloss and complete freedom from faults, a distinct increase in the adhesion of the films to the substrate is evident apart from their increased resistance to solvents. In this context the term substrate includes any primer applied beforehand and also the un-pretreated metal.

Although the coating agents according to the invention are particularly suitable for producing coatings on metals, they may also be used in principle for spraying and coating other substrates such as wood, paper, textiles, glass, plastics, ceramics and other materials. The only requirement is that the polymer film applied to the substrate should be insoluble during ultimate hardening, i.e. sufficiently resistant to water and solvents, and should attain its final properties without causing destruction of the substrate.

The parts and percentages quoted in the following examples and Comparison Test are by weight unless otherwise indicated.

COMPARISON TEST 1

(a) Preparation of copolymer A

A mixture of 95.0 parts of methyl methacrylate and 5.0 parts of methyl acrylate in 94.5 parts of toluene, 18.9 parts of n-butanol and 75.6 parts of methyl ethyl ketone, are introduced into a flask equipped with reflux condenser, stirring mechanism and dropping funnel. Following the addition of 12.5% of an activator solution of 1.6 parts of tert.-butyl peroctoate in 10.5 parts of toluene, 2.1 parts of n-butanol and 8.4 parts of methyl ethyl ketone, the mixture is brought to the boil. Two hours after the beginning of boiling, another 12.5% of the activator solution are added, followed an hour later by a further 12.5% of activator solution, another hour later by 25.05%, and another two hours later by the remaining 37.5% of the activator solution. The product is then stirred for 4 hours at the boiling temperature. A resin solution with a solids content of 32.8% and a runout viscosity in a 6 mm. DIN beaker (DIN 53 211) of 26 seconds.

(b) Preparation of lacquer mixture A1

22.3 g. of a 20% solution of cellulose acetobutyrate and 8.65 g. of benzyl butyl phthalate as plasticiser are added to 69.7 g. of the approximately 33% solution of polymer A prepared in accordance with Comparison Test 1a, and the components are mixed until a homogeneous mixture is formed. A mixture of toluene, methyl ethyl ketone and ethyl glycol acetate in a ratio by weight of 5:4:1, is used as solvent for the cellulose acetobutyrate. The acetobutyrate has an acetyl content of 13.6% and a butyl content of 38.7%.

This mixture is pigmented with 1.6 g. of a finely divided commercial aluminium bronze for coating purposes. Following dilution with the aforementioned solvent mixture to a spraying viscosity of from 14 to 16 seconds runout time from a 4 mm. DIN beaker, the lacquer is sprayed with a pneumatic spray gun. Untreated steel panels (approx. 0.5 to 0.7 mm. thick) and steel panels coated with corrosion-resistant primers were used as substrates. The dried lacquer films have a thickness of from 40 to 60 μm.

After two minutes at room temperature, the spray-lacquered panels are dried for 30 minutes at 70° C., and half of them wetground with 600-grade abrasive paper followed by stoving for 30 minutes at 130° C.

The panels thus treated had a high-gloss finish, the ground areas were smoothed through levelling of the surface during the heat treatment at 130° C. There were no traces of grinding afterwards. The samples had a uniform light metal finish. They were subjected to lacquer tests the results of which are set out in Table 1.

(c) Preparation of lacquer mixture A2

As in Comparison Test 1b, 69.7 g. of the polymer solution A are mixed with 22.3 g. of cellulose acetobutyrate solution followed by the addition of a somewhat larger quantity (9.8 g.) of benzyl butyl phthalate. This solution of the individual lacquer components is pigmented with aluminium bronze as described above and then processed and tested again as described above. The ratio by weight between the lacquer components is 100:20:43:7. The results are set out in Table 1.

(d) Preparation of lacquer mixture A3

As in Comparison Test 1, paragraph c, 69.7 g. of polymer solution A, 27.9 g. of the cellulose acetobutyrate solution and 10.5 g. of benzyl butyl phthalate are mixed together. Pigmenting of the same intensity is effected with aluminium bronze as in 1c. The ratio by weight between the solid lacquer components is 100:25:45:7. Table 1 sets out the results of the lacquer tests.

COMPARISON TEST 2

(a) Preparation of copolymer B

As in Comparison Test 1, a monomer mixture of 90 parts of methyl methacrylate and 10 parts of methyl acrylate was polymerised. A polymer solution with a solids content of 32.3% and a runout viscosity, as measured in 6 mm. DIN beaker (DIN 53 211), of 21 seconds was obtained.

(b) Preparation of lacquer mixture B1

As in Comparison Test 1b, a lacquer mixture is pre-prepared from 70.8 g. of polymer solution B, 22.3 g. of the 20% cellulose acetobutyrate solution and 9.1 g. of benzyl butyl phthalate. This lacquer mixture is pigmented with the same quantity of aluminium bronze, sprayed onto metal panels and tested. The results are set out in Table 1.

EXPLANATIONS TO TABLES 1 TO 3

(A) Solvent resistance (u) Unaffected, unswollen and unmarkable with a finger nail after the period indicated
(1) Slightly swollen but difficult to scratch after the time indicated
(2) Slightly swollen and easy to scratch after the time indicated
(3) Very swollen, begins to curl and separate from the substrate after the time indicated
(4) Film almost completely dissolved and tacky and can be wiped away after the time indicated (B) Bending test The table shows the bending angle of the panel bent in jerks over a sharp edge until it could be bent without any faults being developed in the lacquer film (+). The symbol (−) signifies damage in the lacquer film or splitting of the film at the angle indicated.

TABLE 1

| | Lacquer mixture | | | | | | | |
|---|---|---|---|---|---|---|---|---|
| | A1 | | A2 | | A3 | | B1 | |
| Substrate | Steel plate | Epoxyester primer | Steel plate | Epoxyester primer | Steel plate | Epoxyester primer | Steel plate | Epoxyester primer |
| Solid acrylate polymer (parts) | | 100 | | 100 | | 100 | | 100 |
| Solid cellulose acetobutyrate (parts) | | 20 | | 20 | | 25 | | 20 |
| Plasticiser (parts) | | 38 | | 43 | | 45 | | 40 |
| Solid pigment (parts) | | 7 | | 7 | | 7 | | 7 |
| Reflow effect | Very good. | | Very good. | | Very good. | | Very good. | |
| Gloss | do | | do | | do | | do | |
| Layer thickness, μm | 50–60 | | 60–65 | | 50–60 | | | |
| Lattice cut | 4 | | 4 | | 4 | | 4 | |
| Erichsen penetration, mm | 9.6 | | 9.5 | | 9.5 | | 9.3 | |
| Bending test (sharp edge, in jerks) | 10°(−) | 10–30°(−) (haircracks). | 10°(−) | 10–30°(−) (haircracks). | 10°(−) | 10–30°(−) (haircracks). | 10°(−) | 10–30°(−) (haircracks). |
| Solvent resistance (xylene-impregnated cotton pad) after 1 minute. | 3 | | 3 | | 3 | | 3 | |
| Konig pendulum hardness in seconds | 105 | | 87 | | 75 | | 70 | |

EXAMPLE 1

(a) Preparation of copolymer C

A mixture of 85.5 parts of methyl methacrylate, 4.5 parts of methyl acrylate, 9.0 parts of N-methoxymethylacrylamide and 1.0 part of acrylic acid in 94.5 parts of toluene, 18.9 parts of n-butanol and 75.6 parts of methyl ethyl ketone are introduced into a flask equipped with stirring mechanism, reflux condenser and dropping funnel. Following the addition of 9.5% of an activator solution of 2.1 parts of tert.-butyl peroctoate in 10.5 parts of toluene, 1.9 parts of n-butanol and 8.5 parts of methyl ethyl ketone, the mixture is brought to the boil. The rest of the activator solution is added dropwise at boiling temperature in accordance with the following time schedule: after another 2 hours, 14.5%; after 3 hours, 19.0%; after 4 hours; 28.5%; and after 6 hours, 28.5% of the activator solution. A polymer solution with a solids content of 32.7% and a runout viscosity, as measured in a 6 mm. DIN breaker, of 17 seconds is obtained.

(b) Preparation of lacquer mixture C

As described in Comparison Test 1, lacquer mixture A1, 69.7 g. of polymer solution C, and 2.3 g. of the cellulose acetobutyrate solution are mixed with 9.1 of benzyl butyl phthalate and the resulting mixture is pigmented. Part of this lacquer is immediately sprayed, a second part is mixed with 1.0 part of maleic acid, based on 100 parts of the solid acrylate, and a third part is mixed with 0.5 part of crystalline phosphoric acid, again based on solid acrylate, and similarly processed. These lacquers are designated C1, C2 and C3. The ratio by weight of the mixture is 100:20:40:7. The results are set out in Table 2.

The same lacquer mixture, 40% pigmented with titanium dioxide of the rutile type (based on solid acrylate polymer) and catalysed in the usual way with 0.5% of phosphoric acid (based on pure acrylate) produced an equally good set of properties, as can be seen from Table 2 (=C4).

EXAMPLE 2

(a) Preparation of the copolymer D

A mixture of 85.5 parts of methyl methacrylate, 4.5 parts of methyl acrylate, 9.0 parts of N-methoxymethyl-acrylamide, 1.0 part of acrylic acid and 1.5 parts of tert.-dodecyl mercaptan in 9.0 parts of n-butanol, 45.0 parts of toluene and 36.0 parts of methyl ethyl ketone, is introduced into a flask equipped with stirring mechanism, reflux condenser and dropping funnel. The activator solution consists of 1.9 parts of tert.-butyl peroctoate in 5.0 parts of toluene, 1.0 part of n-butanol and 4.0 parts of methyl ethyl ketone. Polymerisation is carried out as in Example 1. A polymer solution with a solids content of 50.7% and a runout viscosity, as measured in a 6 mm. DIN beaker, of 490 seconds is obtained.

(b) Preparation of lacquer mixture D

A lacquer mixture is prepared as described above in accordance with the following formulation.

45.0 g. of polymer solution D,
22.3 g. of cellulose acetobutyrate solution,
9.1 g. of benzyl butyl phthalate and
20.0 g. of the solvent mixture according to Comparison Test 1 are pigmented with 1.6 g. of aluminium bronze. In this instance, too, the ratio by weight is 100:20:40:7. This mixture is divided. One part is mixed with 0.5 part of crystalline phosphoric acid (based on 100 parts of solid acrylate). Both lacquers are sprayed on to prepared degreased panels and then stoved and tested as in Comparison Test 1. Films on degreased panels directly stoved at 130° C. are no different in their lacquer properties from films that have been stoved in stages. The results are set in Table 2 under columns C4 and C5.

EXAMPLE 3

(a) Preparation of copolymer B

Polymerisation of a mixture of 82.9 parts of methyl methacrylate, 4.4 parts of methyl acrylate, 8.7 parts of N-methoxymethyl acrylamide, 4.0 parts of acrylic acid and 1.5 parts of tert.-dodecyl mercaptan in 94.5 parts of toluene, 18.9 parts of n-butanol and 75.6 parts of methyl ethyl ketone, is carried out with an activator solution of 1.9 parts of butyl peroctoate in 10.5 parts of toluene, 2.1 parts of n-butanol and 8.4 parts of methyl ethyl ketone by the procedure described in Example 1. A polymer solution with a solids content of 32.8% and a runout viscosity, as measured in a DIN beaker (6 mm.), of 9 seconds is obtained.

(b) Preparation of lacquer mixture E

As previously described, 69.5 g. of a solution of polymer E are mixed with 22.3 g. of the cellulose acetobutyrate solution and 9.1 g. of benzyl butyl phthalate; and the resulting mixture is pigmented with 1.6 g. of aluminium bronze and sprayed on to degreased panels. The panels are then further processed as described above and tested to determine their lacquer properties. The results are set out in column E of Table 3. F2 differs from F1 by the addition of 0.5 g. of phosphoric acid (based on solid acrylate polymer) as catalyst.

EXAMPLE 4

(a) Preparation of copolymer F

A mixture of 85.5 parts of methyl methacrylate, 4.5 parts of methyl acrylate, 5.0 parts of N-methoxymethyl-acrylamide, 4.0 parts of N-hydroxymethyl-acrylamide, 1.0 part of acrylic acid and 1.5 parts of tert.-dodecyl mercaptan in 94.5 parts of toluene, 18.9 parts of n-butanol and 75.6 parts of methyl ethyl ketone, is polymerised with an activator solution of 1.9 parts of tert.-butyl peroctoate in 10.5 parts of toluene, 2.1 parts of n-butanol and 8.4 parts of methyl ethyl ketone by the procedure described in Example 1. A polymer solution with a solids content of 32.8% and a runout viscosity, as measured in a 6 mm. DIN beaker, of 9 seconds is obtained.

(b) Preparation of the lacquer mixture F

As in Comparison Test 1, 69.0 g. of polymer solution F from Example 4 are mixed with 22.3 g. of the 20% cellulose acetobutyrate solution, 9.1 g. of benzyl butyl phthalate and 1.6 g. of aluminium bronze, and the resulting mixture sprayed on to panels and tested as described above. The results are set out in Table 3, columns F1 and F2.

EXAMPLE 5

(a) Preparation of polymer G

A mixture of 85.5 parts of methyl methacrylate, 4.5 parts of methyl acrylate, 4.0 parts of N-methoxymethyl-acrylamide, 2.0 parts of acrylamide, 1.0 part of acrylic acid and 1.5 parts of tert.-dodecyl mercaptan in 94.5 parts of toluene, 18.9 parts of n-butanol and 75.6 parts of methyl ethyl ketone, is polymerised with an activator solution of 1.9 parts of tert.-butyl peroctoate in 10.5 parts of toluene, 2.1 parts of n-butanol and 8.4 parts of methyl ethyl ketone by the procedure described in Example 1. A polymer solution with a solids content of 33.0% and a runout viscosity, as measured in a 6 mm. DIN beaker, of 11 seconds is obtained.

(b) Preparation of lacquer mixtures G1 and G2

69.0 g. of polymer solution G are mixed with 22.3 g. of a 20% solution of a cellulose acetobutyrate acetyl and butyryl content is the same as in Comparison Test 1. In addition, 9.1 g. of benzyl butyl phthalate are added as plasticiser. There is no pigmenting. The lacquers are applied with a pneumatic spray gun to degreased panels, and then stoved. The results are set out in Table 3, columns G1 and G2. The difference between G1 and G2 is that G2 contains 0.2% of crystalline phosphoric acid (based on solid acryl polymer) as catalyst.

TABLE 2

| Lacquer mixture | C1 | C2 | C3 | C4 | D1 | D2 |
|---|---|---|---|---|---|---|
| Substrate | Steel plate | Steel plate | Steel plate | Steel plate | Steel plate | Steel plate |
| Reflow effect | Good | Average to good | Average to good | Good | Good | Good. |
| Gloss | Very good | do | do | Very good | Very good | Do. |
| Layer thickness, μm | 35 | 30 | 35 | 45 | 36 | 34-37. |
| Lattice cut | 1 | 1 | 1 | 1-2 | 1 | 1. |
| Erichsen penetration, mm | 9.1+ | 9.4+ | 9.3+ | 9.7+ | 9.0 | 10.2. |
| Bending test (sharp edge in jerks) | 90° (−) | 180° (+) | 180° (+) | 90° (−) | 180° (+) | 180° (+). |
| Solvent resistance (xylene impregnated cotton pad) after 1 minute | u to 1 | u | u | u | u | u after 3 mins. |
| Konigs pendulum hardness in seconds | 110 | 119 | 118 | 124 | | |
| Storability | >6 months | >6 months | >6 months | >6 months | >6 months | >6 months. |

NOTE.—+ = Plate cracks.

TABLE 3

| Lacquer mixture | E | F1 | F2 | G1 | G2 |
|---|---|---|---|---|---|
| Substrate | Steel plate | Steel plate | Steel plate | Steel plate | Steel plate |
| Reflow effect | Good | Good | Good | Good | Good. |
| Gloss | Very good | Very good | Very good | | |
| Layer thickness, μm | 52 | 30-40 | 40 | 45 | 35. |
| Erichsen penetration mm | 10.4+ | 10.6+ | 9.8+ | 9.9+ | 10.3. |
| Bending test (sharp edge in jerks) | 90°(−) | 10°(−) | 180°(+) | 10°(−) | 180°(3). |
| Solvent resistance (xylene impregnated cotton pad) after 1 minute | u to 1 | u | u | u | u. |
| Konigs pendulum hardness in seconds | 95 | | | | |
| Storability | >6 months | >6 months | >6 months | >6 months | >6 months. |

NOTE.—+ = Plate cracks.

We claim:

1. A spontaneously-crosslinkable coating agent for the thermoplastic reflow lacquering process which comprises a solvent solution of a copolymer of (a) 65 to 95% by weight of an alkyl ester of methacrylic acid having from 1 to 3 carbon atoms in the alkyl radical, (b) 0.1 to 15% by weight of an alkyl ester of acrylic acid having from 1 to 4 carbon atoms in the alkyl radical, (c) 0.5 to 20% by weight of N-hydroxymethyl-acrylamide or -methacrylamine and/or an alkyl ether thereof in which the alkyl radical contains from 1 to 8 carbon atoms, (d) 0 to 10% by weight of an $\alpha,\beta$-unsaturated carboxylic acid amine containing from 3 to 5 carbon atoms and (e) 0 to 10% by weight of an $\alpha,\beta$-unsaturated monocarboxylic or dicarboxylic acid with from 3 to 5 carbon atoms and for each 100 parts by weight of said copolymer, from 10 to 30 parts by weight of cellulose acetobutyrate and from 20 to 60 parts by weight of benzyl butyl phthalate, dibutyl phthalate, dicyclohexyl phthalate, tricresyl phosphate, triphenyl phosphate, dibutyl adipate or benzyl octyl adipate.

2. A coating agent as claimed in claim 1 wherein component (e) is present in an amount of from 0.1 to 10% by weight.

References Cited

UNITED STATES PATENTS

| 2,860,110 | 11/1958 | Godshalk | 260—17 R |
| 3,161,609 | 12/1964 | Graham et al. | 260—17 R |
| 3,231,533 | 1/1966 | Garrett et al. | 260—80.73 X |
| 3,361,695 | 1/1968 | Wihelm et al. | 260—80.73 X |
| 3,551,525 | 12/1970 | Wilhelm et al. | 260—80.81 X |

FOREIGN PATENTS

| 1,103,486 | 3/1961 | Germany | 260—17 R |

WILLIAM H. SHORT, Primary Examiner

L. M. PHYNES, Assistant Examiner

U.S. Cl. X.R.

117—132 R, C, 161 UT, UC; 260—30.6 R, 31.8 N, G, 78.5 R, E 80.73, 80.81